US005549357A

United States Patent [19]

[11] Patent Number: 5,549,357

[45] Date of Patent: Aug. 27, 1996

Counts et al.

[54] ADJUSTABLE BACKREST APPARATUS FOR WHEELCHAIRS

[75] Inventors: David M. Counts, Fresno; Rex W. Stevens, Clovis, both of Calif.

[73] Assignee: Quickie Designs Inc., Fresno, Calif.

[21] Appl. No.: 353,803

[22] Filed: Dec. 12, 1994

[51] Int. Cl.[6] .......................... B60N 2/02

[52] U.S. Cl. .......................... 297/354.13; 297/362.11; 297/DIG. 4; 280/304.1

[58] Field of Search .......................... 180/907; 280/250.1, 280/304.1; 297/DIG. 4, 353, 354.1, 354.12, 354.13, 358, 361.1, 362.11, 463.1

[56] References Cited

U.S. PATENT DOCUMENTS

| | | | |
|---|---|---|---|
| 2,694,437 | 11/1954 | Glaser . | |
| 4,005,903 | 2/1977 | Jenni . | |
| 4,494,792 | 1/1985 | Quercy . | |
| 4,655,471 | 4/1987 | Peek . | |
| 5,044,647 | 9/1991 | Patterson . | |
| 5,181,762 | 1/1993 | Beumer | 297/358 |
| 5,320,412 | 6/1994 | Eakins et al. . | |

*Primary Examiner*—Milton Nelson, Jr.

*Attorney, Agent, or Firm*—Flehr, Hohbach, Test, Albritton & Herbert

[57] ABSTRACT

A reclining backrest apparatus (10) for a wheelchair assembly (11) having a main frame (12). The backrest apparatus (10) includes a backrest frame (13) which is pivotally mounted to the main frame (12) between a normal position and a reclined position. A backrest support assembly (15) is included which slidably mounts the backrest frame (13) for movement between an extended position and a retracted position. A cord member or tendon (17) has one end (20) mounted to the backrest support assembly (15), and an opposite end (21) mounted to the wheelchair main frame (12). A pulley assembly (23) is coupled to the backrest frame (13) for pivotal movement about a horizontal axis (14) during pivotal movement of the backrest frame (13). The pulley assembly (23) engages the cord member (17) causing the support assembly (15) to move longitudinally along the backrest frame (13) between the extended position and the retracted position during movement of the backrest frame (13) between the normal position and the reclined position.

24 Claims, 4 Drawing Sheets

ADJUSTABLE BACKREST APPARATUS FOR WHEELCHAIRS

TECHNICAL FIELD

The present invention relates, generally, to backrest apparatus and, more particularly, to foldable backrest apparatus for wheelchair assemblies.

BACKGROUND ART

Wheelchairs have been designed to provide transportation for the physically impaired, often emphasizing user comfort, portability and flexibility. Because of the individual needs and requirements of the wheelchair occupants, a variety of styles and shapes have been developed which cater to their specific needs. Thus, both manual and power driven wheelchair apparatus have become significantly more sophisticated during the past decade.

One advantageous feature common to both manual and power driven wheelchair apparatus is to provide a backrest portion of the seat support which moves pivotally between a generally vertical position and a generally horizontal position (forwardly or rearwardly) parallel to the seat. This arrangement provides either user comfort or provides for partial collapsibility of the wheelchair frame to reduce the overall dimensions for storage or transportation. Often, the backrest portion may be reclined substantially rearwardly while the occupant remains in the wheelchair for therapy or increased accessibility during examinations.

One problem associated with these pivotal backrests during reclination, however, is that body shear forces are produced on the back and the buttocks of the wheelchair occupant. Typically, a backrest pad is fixedly mounted to a backrest frame which is pivotally mounted to the wheelchair main frame about a generally horizontal axis. When the backrest frame is reclined with the wheelchair occupant still seated in the wheelchair, the backrest pad slides along the occupant's back in a direction toward their head causing body shear.

Attempts to overcome this problem usually include cooperating mechanisms formed to coordinate travel of the back assembly with the forward travel of the seat assembly. Generally, a wheelchair is provided including a pivotal backrest assembly having a backrest portion formed for sliding movement longitudinally along the backrest frame in coordination with the reclining of the backrest frame. Typical of these patented sliding backrest devices are the assemblies found in U.S. Pat. Nos. 5,320,412; 5,044,647; and 4,655,471.

While these assemblies have been adequate to reduce the shear forces between the occupant's back and the backrest assembly, they generally include a complicated assembly of interengaging linkages which are difficult to assemble and costly to manufacture. Moreover, a portion of these linkages often must be positioned beneath the seat assembly which causes the overall height of the wheelchair to be increased.

DISCLOSURE OF INVENTION

Accordingly, it is an object of the present invention to provide a backrest apparatus for a chair which reduces shear forces between the wheelchair occupant's back and the backrest during reclination of the backrest.

Another object of the present invention is to provide a backrest apparatus which coordinates sliding movement of a backrest pad longitudinally along a backrest frame of the backrest assembly during reclining of the backrest.

It is another object of the present invention to provide a shear force reducing backrest apparatus for a wheelchair which maintains an overall height dimension similar to a conventional wheelchair.

Yet another object of the present invention is to provide a shear force reducing backrest apparatus for a wheelchair which can be retrofit to a conventional wheelchair.

Still another object of the present invention is to provide a shear force reducing backrest apparatus for a wheelchair which can be adjusted to accommodate a variety of wheelchairs.

It is a further object of the present invention to provide a reclining backrest apparatus for a wheelchair which is durable, compact, easy to maintain, has a minimum number of components, is easy to use by unskilled personnel, and is economical to manufacture.

The present invention includes a reclining backrest apparatus for a chair having a main frame. The backrest apparatus includes, briefly, a backrest frame which is mounted to the main frame for angular displacement, preferably by pivoting, about a generally horizontal axis between a normal position and a reclined position. A backrest support assembly is included which slidably mounts the backrest frame for movement between an extended position and a retracted position. An elongated, flexible, substantially nonresilient cord member or tendon has one end mounted to the backrest support assembly, and an opposite end mounted to an anchor member other than the backrest frame or the backrest support assembly. The backrest apparatus of the present invention further includes a pulley assembly having a displacement member spaced-apart from the horizontal axis which is coupled to the backrest frame for movement relative to the horizontal axis during pivotal movement of the backrest frame between the normal position and the reclined position. The displacement member engages the cord member to urge the support assembly slidably along the longitudinal axis of the backrest frame between the extended position and the retracted position during movement of the backrest frame between the normal position and the reclined position.

Accordingly, the backrest support assembly is slidably urged downwardly along the backrest frame to substantially remain in a fixed position relative to the wheelchair occupant's back during lowering or reclining of the backrest frame. This simplified backrest arrangement minimizes or substantially reduces body shear acting on the wheelchair occupant's back while maintaining the overall seat height of a conventional wheelchair.

BRIEF DESCRIPTION OF THE DRAWING

The assembly of the present invention has other objects and features of advantage which will be more readily apparent from the following description of the Best Mode of Carrying Out the Invention and the appended claims, when taken in conjunction with the accompanying drawing, in which:

BEST MODE OF CARRYING OUT THE INVENTION

Figure 1A:
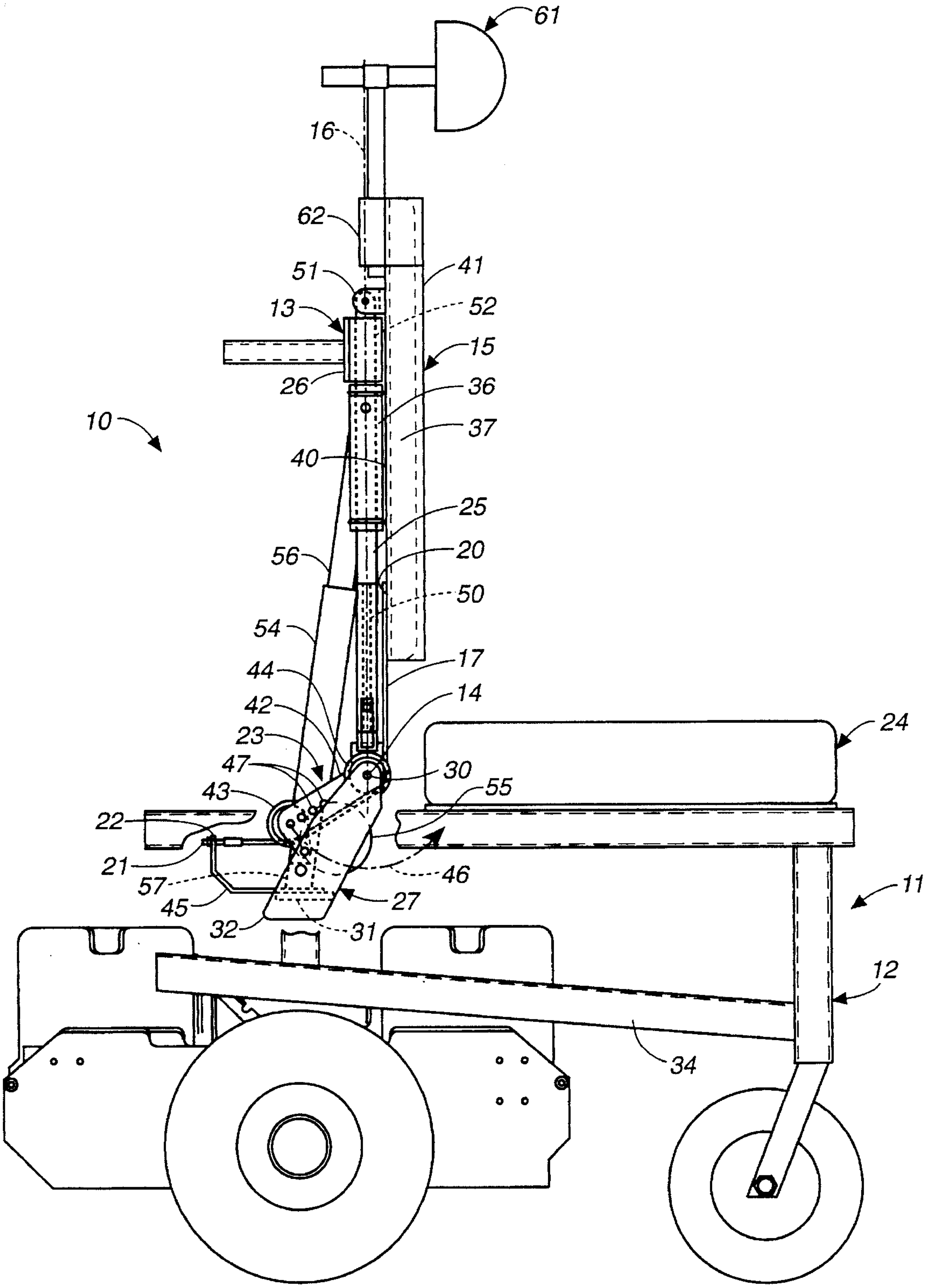
FIGS. 1A and 1B are a series of side elevation views, partially broken away, of a reclining backrest apparatus constructed in accordance with the present invention, and mounted to a wheelchair main frame.

The following description is presented to enable a person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded with the widest scope consistent with the principles and features disclosed herein. It will be noted here that for a better understanding, like components are designated by like reference numerals throughout the various figures.

Figure 1B:
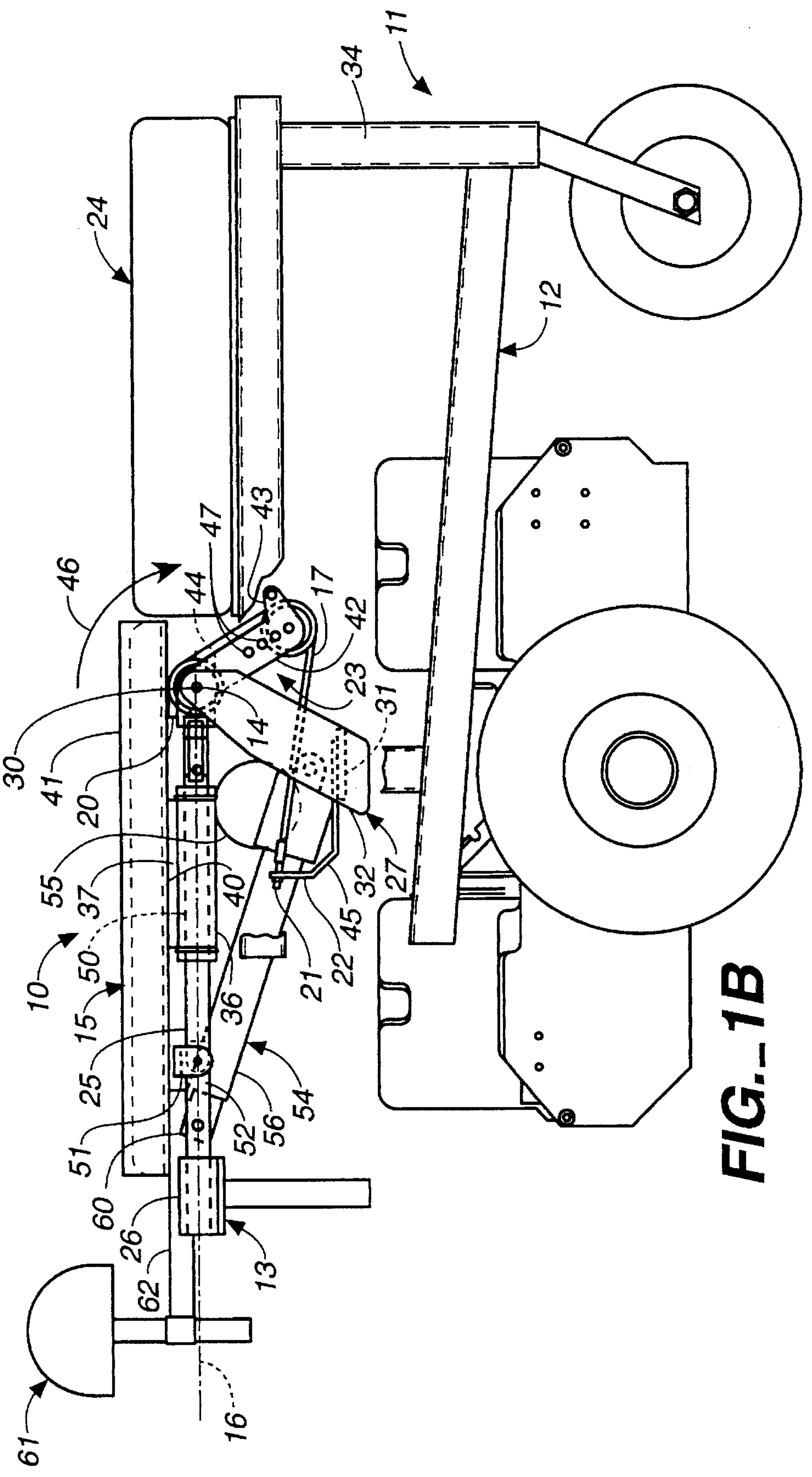
Figure 2:
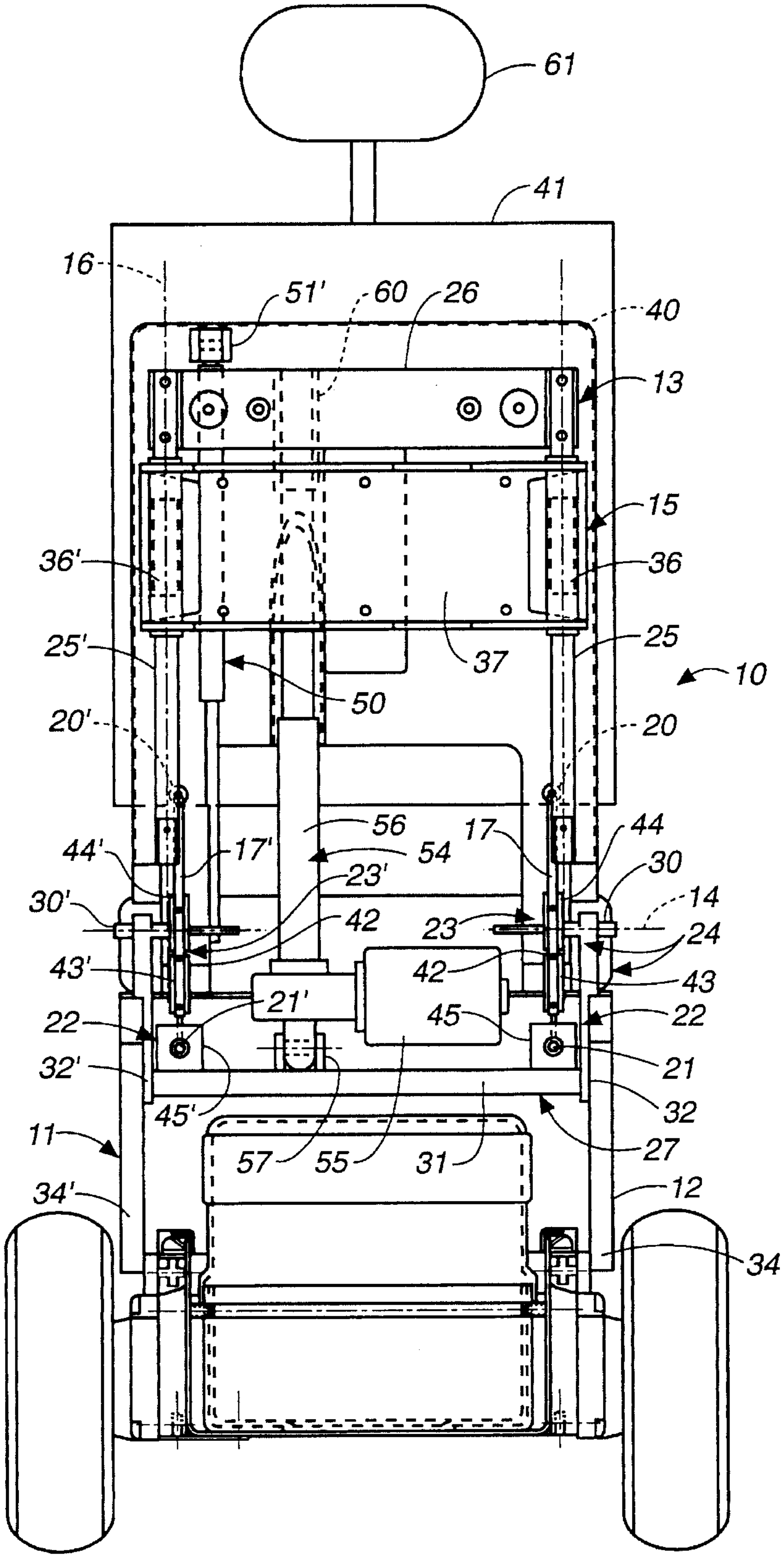
FIG. 2 is rear elevation view of the reclining backrest apparatus of FIG. 1A.
Figure 3:
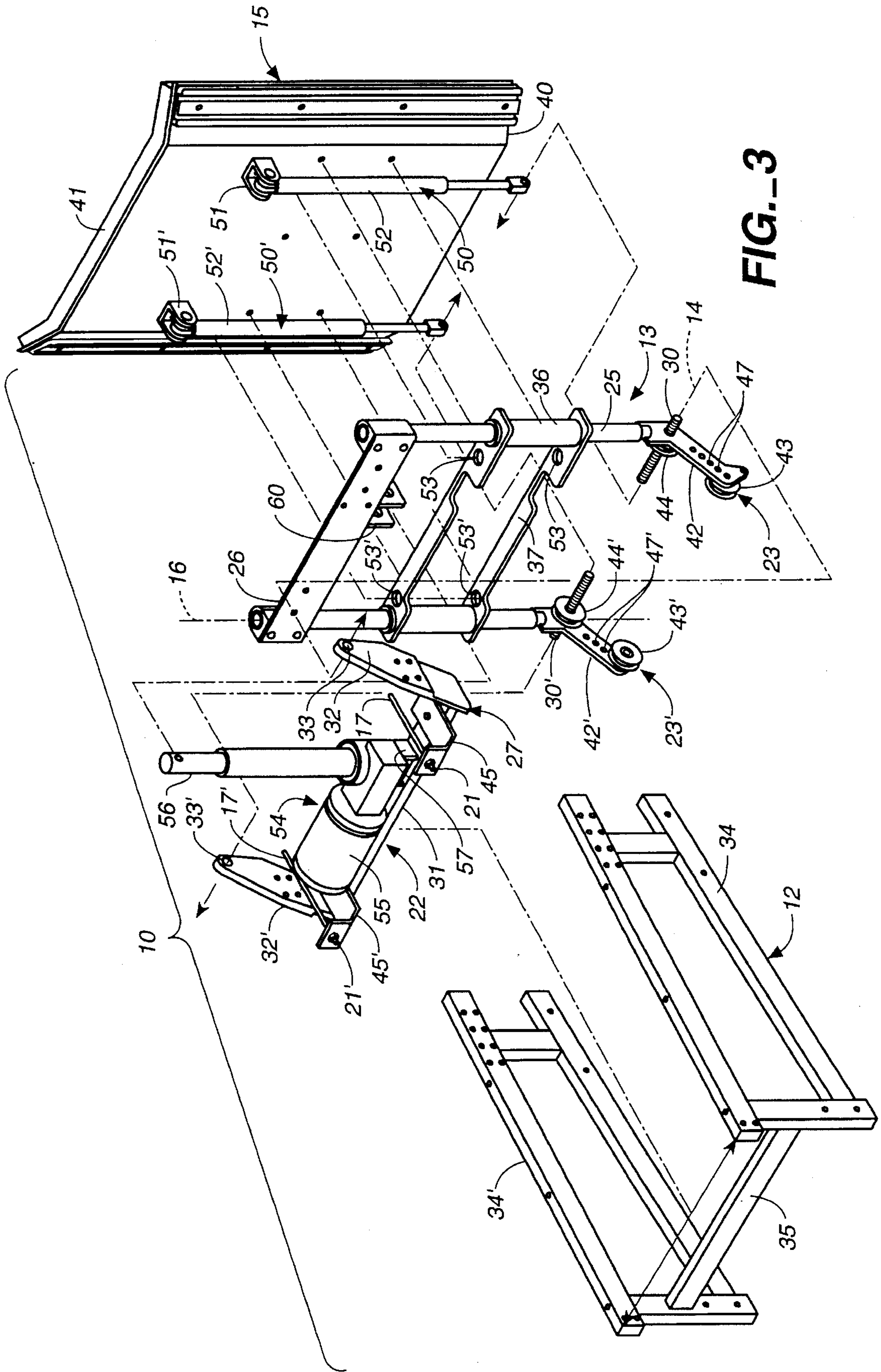
FIG. 3 is a reduced exploded, top perspective view of the reclining backrest apparatus of FIG. 1A.

Attention is now directed to FIGS. 1–3, where the subject reclining backrest apparatus, generally designated 10, is illustrated operably mounted to a wheelchair assembly 11 having a main frame 12. The backrest apparatus -10 includes a backrest frame 13 which is mounted to main frame 12 for angular displacement, preferably by pivoting, about a generally horizontal axis 14 between a normal position (FIGS. 1A and 2) and a reclined position (FIG. 1B). Further, a backrest support assembly, generally designated 15, is slidably mounted to backrest frame 13 for movement between an extended position (FIGS. 1A and 2) and a retracted position (FIG. 1B) along a longitudinal axis 16 of backrest frame 13. In the extended position, the support assembly is positioned proximate a top portion of the backrest frame, while in the retracted position, the support assembly moves downwardly toward a lower portion of the backrest frame.

An elongated, flexible, substantially non-resilient cord member or tendon, generally designated 17, has one end 20 mounted to backrest support assembly 15, and an opposite end 21 mounted to an anchor member 22 other than backrest frame 13 or backrest support assembly 15 (for example, to a bracket mounted to the main frame, as described below). The backrest apparatus of the present invention further includes a pulley assembly, generally designated 23, having a displacement member 43 spaced-apart from the horizontal axis 14, and which is coupled to backrest frame 13 for movement relative to the horizontal axis during pivotal movement of backrest frame 13 between the normal and the reclined positions. FIGS. 1A and 1B illustrate that displacement member 43 engages cord member 17 to urge support assembly 15 slidably along the longitudinal axis 16 of backrest frame 13 between the extended and the retracted positions during movement of the backrest frame between the normal and the reclined positions.

Accordingly, the present invention generally employs a flexible cord or cable device 17 and an off-set displacement member 43 of pulley assembly 23 to reciprocate backrest support assembly 15 between the extended position (FIGS. 1A and 2) and the retracted position (FIG. 1B). As a result, the support assembly is slidably urged downwardly along the longitudinal axis 16 of backrest frame 13 to coordinate the position of support assembly 15 relative a wheelchair occupant's back (not shown) during lowering or reclination of backrest frame 13. Hence, the present invention provides a reclining backrest apparatus which keeps the backrest in a substantially fixed position relative to the user's back thus substantially reducing body shear during reclining. The backrest assembly of the present invention also is much less complex than the interengaging linkages of the prior art backrest apparatus.

Moreover, due to the relative compact nature of the components employed in the present invention, placement thereof can be totally behind the backrest frame rather than partially under the seat assembly 24, as in the prior art. This arrangement decreases the overall seat height dimension of the seat assembly so that the ride height can be maintained substantially similar to those of a conventional wheelchair. Further, another advantage of this arrangement is that it allows backrest apparatus 10 to be retrofit to many conventional wheelchair frames having pivotally mounted backrests.

Referring now to FIG. 3, backrest frame 13 preferably includes two-spaced apart, generally parallel guide posts 25, 25' axially aligned in the direction of longitudinal axis 16. A cross-bar 26 is mounted to and extends between an upper end of each guide post 25, 25' which provides lateral stability and support therebetween. The lower distal ends of the guide posts are mounted to pulley assembly 23 which pivots about horizontal axis 14 together as a unit.

Both the pulley assembly and the backrest frame are pivotally mounted to a mounting bracket 27 (FIG. 3) through pivot bolts 30, 30' for pivotal movement between the normal position and the reclined position. Mounting bracket 27 includes a central plate portion 31 coupled between two opposing end brackets 32, 32'. Each pivot bolt 30, 30' extends through an aperture 33, 33' (FIG. 3) of a corresponding end bracket 32, 32' for pivotal mounting of the respective guide post 25, 25'.

In the preferred form, mounting bracket 27 is affixed to wheelchair main frame 12. As shown in FIG. 3, the wheelchair main frame may include a pair of spaced-apart upstanding truss members 34, 34' coupled together by at least one transverse cross-member 35. Each end bracket 32, 32' of mounting bracket 27 is rigidly mounted to a corresponding truss member 34, 34' for mounting support. It will be understood, hence, that mounting bracket 27 could be integrally formed with the wheelchair main frame without departing from the true spirit and nature of the present invention.

As best viewed in FIGS. 2 and 3, support assembly 15 includes a pair of spaced sleeve members 36, 36' rigidly coupled together by a sleeve support beam 37 extending therebetween to form a single unit. Each sleeve member 36, 36' is formed for sliding receipt of a respective guide post 25, 25' for movement thereof along the longitudinal axis 16 of backrest frame 13 between the extended position (FIGS. 1A and 2) and the reclined position (FIG. 1B).

Mounted to sleeve support beam 37 is a generally rigid back support plate 40 formed and dimensioned to receive and support the back of the wheelchair occupant's torso therein. A support pad 41 may be included mounted to back support plate 40 to provide additional comfort. Accordingly, as sleeve members 36, 36' reciprocate slidingly along the respective guide posts 25, 25' during pivotal movement of the backrest frame between the normal position and the reclined position, back support plate 40 and/or support pad 41 move longitudinally with the sleeve members between the extended position and the retracted position, respectively. This arrangement substantially reduces or minimizes body shear between the occupant's back and the support plate/support pad.

In the preferred embodiment, pulley assembly 23, as shown in FIG. 3, is rigidly mounted to the distal ends of guide posts 25, 25'. Hence, pulley assembly 23 pivots about the horizontal axis 14 at pivot bolts 30, 30' together with backrest frame 13 as a unit. It will be understood, however, that pulley assembly 23 could pivot about horizontal axis 14 in some proportional relation with that of backrest frame 13 without departing from the present invention.

Pulley assembly 23 preferably includes a pair of off-set brackets 42, 42' each extending radially away from the horizontal axis 14 upon which displacement members 43, 43 are mounted. Further, the displacement members are preferably provided by cord displacement pulleys 43, 43' which are rotatably mounted to corresponding off-set brackets 42, 42' which pivots about horizontal axis 14. Preferably, a stationary alignment pulley 44, 44' is also rotatably mounted to off-set bracket 42, 42' at a position co-axial with horizontal axis 14 which helps align the cord member therein. Both the displacement pulley 43, 43' and the stationary pulley 44, 44' include a circumferential groove formed to rotatably engage and contact cord member 17, 17'.

FIGS. 1A and 1B illustrate that one end 20 of cord or tendon member 17 is fixedly mounted to a rear facing surface of backrest support plate 40, while an opposite end 21 thereof is mounted to an anchor member 22 such as wheelchair main frame 12. Preferably, the opposite end 21, 21' of cord member 17, 17' is fixedly mounted to a shear adjustment bracket 45, 45' of mounting bracket 27 (FIG. 3). Briefly, member 17 is preferably provided a relatively thin, laterally flexible, non-resilient material, such as a metal or plastic cord, tendon, cable, rope or the like.

In accordance with the present invention, as backrest frame 13 reciprocates between the normal position and the reclined position, the displacement pulley 43, 43' moves along an arcuate path 46 about horizontal axis 14 (FIGS. 1A and 1B). The arcuate motion of the displacement pulley cause engagement with the corresponding cord member 17, 17' which in turn causes support plate 40 of backrest support assembly 15 to reciprocate between the extended and the retracted position.

To adjust the sliding displacement of support plate 40 along the longitudinal axis 16, each off-set bracket 42, 42' includes a plurality of spaced-apart mounting apertures 47, 47' situated longitudinally therealong. Positioning of displacement pulley 43, 43' closer to horizontal axis 14 causes a smaller sliding displacement of the support plate, while placement further away from horizontal axis 14 causes a larger sliding displacement. Accordingly, it will be understood that it is primarily the off-set nature of the displacement pulley from the horizontal axis which causes the sliding displacement of the backrest support assembly.

A biasing device 50, 50' is included which biases support assembly .15 toward the extended position (FIG. 3). As backrest frame 13 pivots from the reclined position back to the normal position, biasing device 50, 50' urges support assembly 15 from the retracted position back toward the extended position. Biasing device 50, 50' is preferably provided by a pair of telescopically extending pneumatic pistons 50, 50' having one end pivotally mounted to pivot bolts 30, 30' and an opposite end pivotally mounted to the rear facing surface of support plate 40 through a U-shaped bracket 51, 51'. Accordingly, when backrest frame 13 is in the reclined position, and support assembly 15 is in the retracted position, the pneumatic pistons are telescopically retracted. In contrast, when backrest frame 13 is moved to the normal position, the pneumatic pistons telescopically extend to move support assembly 15 automatically to the extended position.

Each piston device 50, 50' includes a tube member 52, 52' which is slidably received through openings 53, 53' (FIG. 3) in sleeve support beam 37 which enable reciprocation of support assembly 15 without interference with the piston device.

In the preferred embodiment of the present invention, a motor mechanism 54 is operably mounted between backrest frame 13 and wheelchair main frame 12 for power assisted reciprocating movement of the backrest frame, and hence, support assembly 15, between the normal position and the reclined position. Motor mechanism 54 is preferably includes an electrically driven motor 55, and a telescopically extending arm 56. One end of arm 56 is pivotally supported atop the mounting bracket central plate 31 though a lower bracket 57, while the opposite end of arm 56 is pivotally mounted to the backrest frame cross-bar 26 through an upper bracket 60.

A headrest assembly 61, as shown in FIGS. 1A, 1B and 2, may be provided mounted to the rear facing surface of backrest support plate 40. A headrest mounting bracket 62 must be of a sufficient dimension so as not to interfere with cross-bar 26 when support plate 40 reciprocates longitudinally along backrest frame 13.

What is claimed is:

1. A reclining backrest apparatus for use with a chair having a main frame comprising:

a backrest frame having a longitudinal axis and adapted to be mounted to the chair main frame for angular displacement about a generally horizontal axis between a normal position and a reclined position;

a backrest support assembly slidably mounted to said backrest frame for movement between an extended position and a retracted position;

an elongated, laterally flexible, substantially nonresilient cord member having one end mounted to said backrest support assembly, and an opposite end mounted to an anchor member other than said backrest frame and said backrest support assembly; and a pulley assembly having a displacement member spaced-apart from said horizontal axis, and coupled to said backrest frame for movement relative to said horizontal axis during angular displacement of said backrest frame between said normal position and said reclined position, said displacement member engaging said cord member and urging said support assembly slidably along the longitudinal axis of said backrest frame between said extended position and said retracted position during movement of said backrest frame between said normal position and said reclined position.

2. The backrest apparatus as defined in claim 1 further including:

a biasing device coupled to said backrest support assembly for biasing of paid backrest support assembly toward said extended position.

3. The backrest apparatus as defined in claim 2 wherein, said biasing device includes a telescopic piston device having one end pivotally mounted relative to said backrest frame, and an opposite end pivotally mounted to said backrest support assembly.

4. The backrest apparatus as defined in claim 3 wherein, said piston device is pneumatically driven.

5. The backrest apparatus as defined in claim 1 wherein, said anchor member is adapted to be mounted to the main frame.

6. The backrest apparatus as defined in claim 1 wherein, said cord member is provided by metallic cable.

7. The backrest apparatus as defined in claim 1 wherein, said displacement member is mounted for pivotal movement about said horizontal axis during angular displacement of said backrest frame between said normal position and said reclined position.

8. The backrest apparatus as defined in claim 7 wherein, said pulley assembly includes an off-set bracket fixedly mounted relative to said backrest frame, and said displacement member being mounted to said off-set bracket and positioned for pivotal displacement about said horizontal axis, said displacement member engaging said cord member in a manner causing the sliding movement of said support assembly between said extended position and said retracted position as said displacement member pivots about said horizontal axis.

9. The backrest apparatus as defined in claim 8 wherein, said displacement member is provided by a displacement pulley rotatably mounted to said off-set bracket.

10. The backrest apparatus as defined in claim 9 wherein, said off-set bracket includes a plurality of spaced-apart mounts positioned longitudinally therealong for selective rotational mounting of said displacement pulley along said off-set bracket.

11. The backrest apparatus as defined in claim 9 wherein, said pulley assembly further includes a stationary pulley engaging said cord member, and rotatably mounted to said off-set bracket in co-axial alignment with said horizontal axis.

12. The backrest apparatus as defined in claim 1 wherein, said backrest frame includes two-spaced apart, generally parallel guide posts aligned along said longitudinal axis, and said backrest support assembly includes a pair of sleeve members each slidably receiving a respective guide post for sliding movement of a respective sleeve member between said extended position and said retracted position.

13. The backrest apparatus as defined in claim 12 wherein, a distal end of each guide post is adapted to be pivotally mounted to the main frame about said horizontal axis.

14. The backrest apparatus as defined in claim 12 wherein, said support assembly further includes a cross-member mounted to and extending between said sleeve members, and a support pad mounted to said cross-member.

15. The backrest apparatus as defined in claim 12 wherein, said pulley assembly includes a first off-set bracket fixedly mounted relative to said backrest frame proximate a lower distal end of one guide post, and a first displacement member mounted to said first off-set bracket and positioned for pivotal displacement about said horizontal axis, said first displacement member engaging the first named cord member in a manner causing the sliding movement of said support assembly between said extended position and said retracted position as said first displacement member pivots about said horizontal axis, and a second off-set bracket fixedly mounted relative to said backrest frame proximate a lower distal end of the other guide post, and a second displacement member mounted to said second off-set bracket and positioned for pivotal displacement about said horizontal axis, said second displacement member engaging a second elongated, flexible, substantially non-resilient cord member in a manner causing the sliding movement of said support assembly between said extended position and said retracted position as said second displacement pulley pivots about said horizontal axis, said second cord member having one end mounted to said backrest support assembly, and an opposite end mounted to an anchor member other than said backrest frame and said backrest support assembly.

16. The backrest apparatus as defined in claim 15 wherein, said first displacement member is provided by a first displacement pulley rotatably mounted to said first off-set bracket, and said second displacement member is provided by a second displacement pulley rotatably mounted to said second off-set bracket.

17. The backrest apparatus as defined in claim 16 wherein, said pulley assembly further includes a first stationary pulley engaging the first named cord member, and rotatably mounted to said first off-set bracket in co-axial alignment with said horizontal axis, and a second stationary pulley engaging said second cord member, and rotatably mounted to said second off-set bracket in co-axial alignment with said horizontal axis.

18. The backrest apparatus as defined in claim 1 further including:

a motor mechanism adapted to be operably mounted between said backrest frame and the main frame for power assisted reciprocating movement of said backrest frame between said normal position and said reclined position.

19. The backrest apparatus as defined in claim 18 wherein, said motor mechanism includes a telescopically extending arm having one end adapted to be pivotally mounted to said main frame, and an opposite end pivotally mounted to said backrest frame.

20. A reclining backrest apparatus for use with a chair having a main frame comprising:

a backrest frame having a longitudinal axis thereof and adapted to be mounted to the chair main frame for pivoting about a generally horizontal axis between a normal position and a reclined position;

a backrest support assembly slidably mounted to said backrest frame for movement between an extended position and a retracted position;

a biasing device coupled to said backrest support assembly for biasing thereof toward said extended position;

a motor mechanism operably mounted between said backrest frame and the main frame for power assisted reciprocating movement of said backrest frame between said normal position and said reclined position an elongated, flexible, substantially non-resilient tendon having one end mounted to said backrest support assembly, and an opposite end adapted to be mounted to the main frame; and a pulley assembly having a displacement member spaced-apart from said horizontal axis, and coupled to said backrest frame for pivotal movement about said horizontal axis during pivotal movement of said backrest frame between said normal position and said reclined position, said displacement member engaging said tendon to urge said support assembly slidably along the longitudinal axis of said backrest frame between said extended position and said retracted position during movement of said backrest frame between said normal position and said reclined position.

21. The backrest apparatus as defined in claim 20 wherein, said pulley assembly includes an off-set bracket fixedly mounted relative to said backrest frame, and said displacement member being mounted to said off-set bracket and positioned for pivotal displacement about said horizontal axis, said displacement member engaging said tendon in a manner causing the sliding movement of said support assembly between said extended position and said retracted position as said displacement member pivots about said horizontal axis.

22. The backrest apparatus as defined in claim 21 wherein, said displacement member is provided by a displacement pulley rotatably mounted to said off-set bracket.

23. The backrest apparatus as defined in claim 22 wherein, said off-set bracket includes a plurality of spaced-apart mounts positioned longitudinally therealong for selective rotational mounting of said displacement pulley along said off-set bracket.

24. The backrest apparatus as defined in claim 23 wherein, said pulley assembly further includes a stationary pulley engaging said tendon, and rotatably mounted to said off-set bracket in co-axial alignment with said horizontal axis.

* * * * *